US007846316B2

(12) United States Patent
Koenig et al.

(10) Patent No.: US 7,846,316 B2
(45) Date of Patent: Dec. 7, 2010

(54) METHOD FOR SUPPLYING A PLATING COMPOSITION WITH DEPOSITION METAL ION DURING A PLATING OPERATION

(75) Inventors: Axel Koenig, Herzogenaurauch (DE); Andreas Möbius, Kaarst (DE); Franz-Josef Stark, Zülpich (DE)

(73) Assignee: Enthone Inc., West Haven, CT (US)

( * ) Notice: Subject to any disclaimer, the term of this patent is extended or adjusted under 35 U.S.C. 154(b) by 1204 days.

(21) Appl. No.: 11/420,339

(22) Filed: May 25, 2006

(65) Prior Publication Data

US 2006/0266654 A1    Nov. 30, 2006

(30) Foreign Application Priority Data

May 25, 2005   (EP)   .................................. 05011287

(51) Int. Cl.
*C25D 21/06*   (2006.01)
*C25D 21/18*   (2006.01)

(52) U.S. Cl. ........................... 205/98; 204/232; 205/99; 205/101

(58) Field of Classification Search ................... 205/98, 205/101
See application file for complete search history.

(56) References Cited

U.S. PATENT DOCUMENTS

| 2,449,422 | A | * | 9/1948 | Smith ........................... 205/101 |
| 2,726,968 | A | | 12/1955 | Spaulding |
| 2,871,142 | A | | 1/1959 | Hays |
| 3,454,490 | A | * | 7/1969 | Wallace ....................... 210/638 |
| 3,674,669 | A | * | 7/1972 | Tuwiner ...................... 204/528 |
| 4,306,946 | A | | 12/1981 | Kim |
| 4,357,220 | A | * | 11/1982 | Eisenmann .................. 210/644 |
| 4,372,830 | A | | 2/1983 | Law |
| 4,490,224 | A | | 12/1984 | Warheit |
| 4,563,337 | A | | 1/1986 | Kim |
| 4,618,428 | A | | 10/1986 | Kim |
| 4,664,808 | A | | 5/1987 | Kim |
| 4,769,152 | A | | 9/1988 | Igawa et al. |

(Continued)

FOREIGN PATENT DOCUMENTS

DE   43 10 366 C1   10/1994

(Continued)

OTHER PUBLICATIONS

Henry H. Law, "Extending the Life of Gold Plating Baths by Donnan Dialysis" Plating and Surface Finishing 69(10) pp. 72-73 (1982).*

(Continued)

*Primary Examiner*—Harry D Wilkins, III
*Assistant Examiner*—Bryan D. Ripa
(74) *Attorney, Agent, or Firm*—Senniger Powers LLP

(57) ABSTRACT

Method and plating bath apparatus for setting the ionic strength of a plating composition using Donnan dialysis by flowing the plating composition along a first surface of a membrane while simultaneously flowing a deposition metal ion exchange composition along a second surface of the membrane such that the deposition metal ion crosses the membrane from the deposition metal ion exchange composition to the plating composition while an exchange cation different from the deposition metal ion crosses the membrane from the plating composition to the deposition metal ion exchange composition.

19 Claims, 2 Drawing Sheets

U.S. PATENT DOCUMENTS

| | | | |
|---|---|---|---|
| 5,162,079 A * | 11/1992 | Brown ........................ 205/101 |
| 5,173,170 A | 12/1992 | Brown et al. |
| 5,188,703 A | 2/1993 | Greenberg |
| 5,312,539 A * | 5/1994 | Thomson .................... 205/101 |
| 5,419,821 A | 5/1995 | Vaughan |
| 5,883,762 A | 3/1999 | Calhoun et al. |
| 6,099,711 A * | 8/2000 | Dahms et al. ............... 205/101 |
| 6,113,769 A * | 9/2000 | Uzoh et al. ................. 205/101 |
| 6,120,673 A | 9/2000 | Reiter et al. |
| 6,245,389 B1 | 6/2001 | Horikawa et al. |
| 6,251,255 B1 * | 6/2001 | Copping et al. ............ 205/300 |
| 6,264,809 B1 | 7/2001 | Lee |
| 6,379,517 B1 | 4/2002 | Heydecke et al. |
| 6,436,213 B1 | 8/2002 | Hopkins |
| 6,521,117 B2 | 2/2003 | Kocherginsky et al. |
| 6,527,920 B1 | 3/2003 | Mayer et al. |
| 6,841,074 B2 | 1/2005 | Mobius et al. |
| 6,890,416 B1 | 5/2005 | Mayer et al. |
| 2005/0133374 A1 * | 6/2005 | Kovarsky et al. ............. 205/99 |

FOREIGN PATENT DOCUMENTS

| | | |
|---|---|---|
| DE | 198 51 180 C1 | 4/2000 |
| EP | 0 246 070 A1 | 11/1987 |
| JP | 56003666 A | 1/1981 |
| JP | 2180621 A | 7/1990 |
| JP | 2761337 | 7/1994 |

OTHER PUBLICATIONS

Hamil; The Application of Donnan Dialysis to Electroplating Washwater Treatment; Dec. 1982; pp. 91-95.

Abstract of JP56003666; Jan. 14, 1981.

Abstract of JP2180621; Jul. 13, 1990.

* cited by examiner

METHOD FOR SUPPLYING A PLATING COMPOSITION WITH DEPOSITION METAL ION DURING A PLATING OPERATION

CROSS REFERENCE TO RELATED APPLICATIONS

This application claims priority from EP patent application number 05011287.9 filed May 25, 2005, the entire disclosure of which is herein incorporated by reference.

FIELD OF THE INVENTION

The present invention relates to a method for supplying a plating composition with a deposition metal ion during a plating operation.

BACKGROUND OF THE INVENTION

Surface modification by the deposition of metals on a variety of substrate materials is a known technique in many fields, such as for example, in the production of printed circuit boards, in plating automobile parts, in plating fittings, etc. The deposited metal layers change the surface characteristics of the coated substrates in decorative and/or functional respects. Electrolytic and electroless metal deposition methods are known for depositing metals.

In either electrolytic or electroless deposition methods, the substrate to be coated is contacted with a composition comprising deposition metal ions. In electrolytic plating, metal deposition occurs when an applied current reduces the deposition metal ions to metal on the surface of the substrate, which acts as a cathode. In electroless deposition, metal deposition occurs when the deposition metal ions are reduced to metal by a redox reaction with a reducing agent.

In either method, the plating composition changes during the course of deposition. For example, the concentration of deposition metal ions decreases. During an electroless plating operation, the concentration of the reducing agent also decreases. Moreover, the concentration of by-products from the plating process, such as by the oxidation of the reducing agent in electroless plating or the oxidation of bath additives at the anode in electrolytic plating, increases. To assure relatively constant performance of the plating bath throughout a plating operation, deposition metal ions may be replenished by adding the metal ion, as a soluble salt, to the plating composition. In electroless plating, the reducing agent, also typically as a soluble salt, may be replenished. Finally, methods have been developed to remove oxidation products from the plating composition, such as by, for example, anion exchange.

Since the deposition metal ions are typically added as soluble salts, replenishment of the plating composition causes the concentration of anions in the plating composition to increase. It is known that increased anion concentration adversely affects the quality of the plating composition and the plated metal. The efficiency of a plating composition may be measured by the number of "metal-turnovers" (MTO) before bath quality and/or deposited metal quality are compromised. One MTO refers to one complete conversion of the original deposition metal ion concentration. For example, for a plating composition having an original metal ion concentration of 1.0 M, one MTO is completed when 1.0 M of the deposition metal ion has been deposited and replenished in the plating bath. Since replenishment of deposition metal ion by the addition of soluble salts increases the concentration of anions in the plating composition, a typical plating composition may achieve between two and five MTO before the plating bath and/or plated metal quality are compromised by an unacceptably high concentration of anion.

Methods have been developed to control the anion concentration by removing oxidation products. For example, DE 19851180 discloses a method for replenishing hypophosphite ion, which is a reducing agent, in an electroless plating composition using a weak base anion exchange membrane. Orthophosphite ion, present in the plating composition as a by-product of the hypophosphite reduction process, can be removed with simultaneous replenishment of hypophosphite reducing agent.

U.S. Pat. No. 2,726,968 also discloses the use of an anion exchange membrane in an electroless nickel plating bath for the replenishment of hypophosphite reducing agent. In this method, hypophosphite is added to the bath while phosphite ion by-product is removed.

DE 4310366 discloses a method for replenishing an electroless plating composition with hypophosphite reducing agent. In this method, an anion exchange membrane is coupled with electrolysis. Hypophosphite and orthophosphite are removed from the electroless plating bath using the anion exchange membrane. The orthophosphite byproduct can be reduced to the hypophosphite reducing agent by electrolysis. After electrolysis, the hypophosphite is returned to the electroless plating bath.

SUMMARY OF THE INVENTION

Among the various aspects of the present invention may be noted the provision of a method for supplying a plating composition with deposition metal ion. The method may use a membrane to replenish the deposition metal ion. The membrane may be an ion exchange membrane or a microporous membrane.

Briefly, therefore, the present invention is directed to a method for setting the ionic concentration of a plating composition, the plating composition useful for depositing metal on the surface of a substrate, the method comprising dialyzing the plating composition by flowing the plating composition along a first surface of a membrane while simultaneously flowing a deposition metal ion exchange composition along a second surface of the membrane such that the deposition metal ion crosses the membrane from the deposition metal ion exchange composition to the plating composition while an exchange cation different from the deposition metal ion crosses the membrane from the plating composition to the deposition metal ion exchange composition.

The invention is further directed to a plating bath apparatus useful for depositing a metal on a surface of a substrate, the plating bath comprising a plating composition, a plating tank, a cation exchange channel comprising a plating composition flow compartment, a deposition metal ion flow compartment, and a membrane which separates the plating composition flow compartment and the deposition metal ion flow compartment, a plating composition source through which a portion of the plating composition flows from the plating tank to the cation exchange channel, a plating composition drain through which a portion of the plating composition flows from the cation exchange channel to the plating tank, a deposition metal ion exchange composition source through which a deposition metal ion exchange composition flows into the cation exchange channel, and a deposition metal ion exchange composition drain through which a deposition metal ion exchange composition flows from the cation exchange channel.

The invention is yet further directed to a method for setting the ionic concentration in a plating composition, the plating composition useful for depositing a metal on a substrate, the method comprising dialyzing the plating composition by flowing the plating composition along a first surface of a membrane while simultaneously flowing an anion exchange composition along a second surface of the membrane such that the deposition metal ion present as the negatively-charged complex crosses the membrane from the anion exchange composition to the plating composition while an exchange anion different from the deposition metal ion present as the negatively-charged complex crosses the membrane from the plating composition to the anion exchange composition.

Other aspects of the invention are in part apparent and in part pointed out hereinafter.

DETAILED DESCRIPTION OF THE PREFERRED EMBODIMENT(S)

Figure 1:
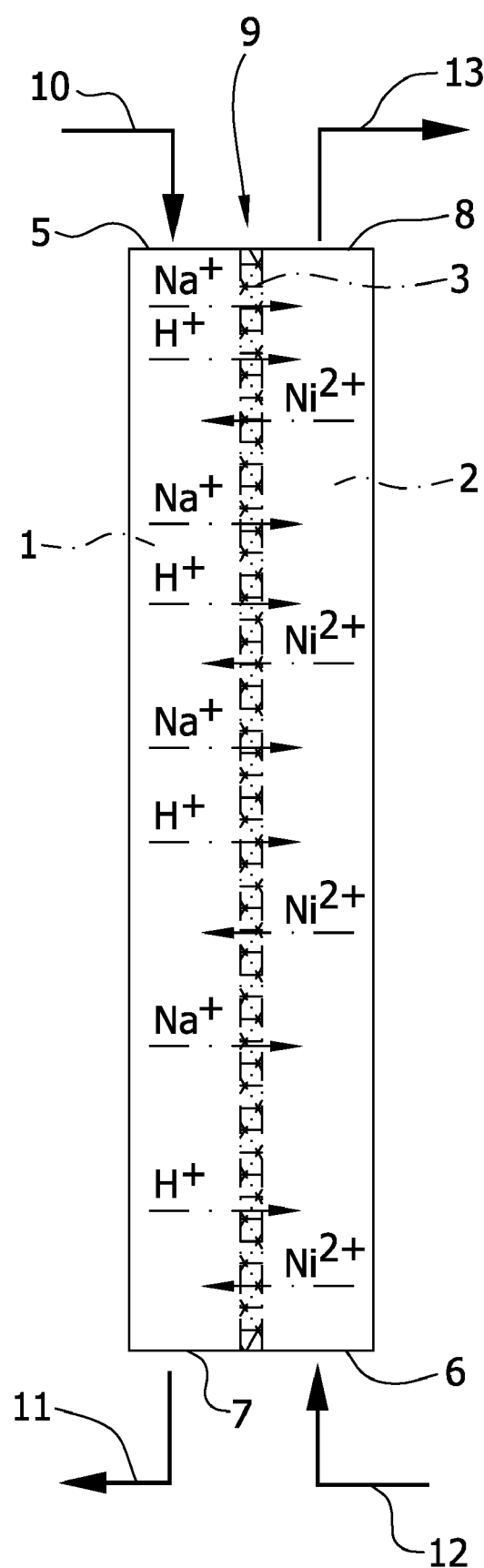
FIG. 1 is a schematic depiction of a cation exchange channel useful for exchanging cations between a plating composition and a deposition metal ion exchange composition.

The present invention is directed to a method which employs Donnan dialysis to supply deposition metal ions in a plating composition. Donnan dialysis refers to a method of ion exchange between two compositions in chemical, but not physical, contact across a membrane, in which the driving force is a chemical potential difference. For example, the chemical potential difference can be established by a concentration gradient. The method sets the ionic concentration of the plating composition. In one embodiment, the method supplies the plating composition with a deposition metal ion with simultaneous removal of an exchange cation from the plating composition, the exchange cation being different from the deposition metal ion. In one embodiment, the method supplies the plating composition with a deposition metal ion present as a negatively-charged complex with simultaneous removal of an exchange anion from the plating composition, the exchange anion being different from the deposition metal ion present as a negatively-charged complex. In one embodiment, the method of the present invention replenishes the plating composition with deposition metal ion during or after a plating operation. In one embodiment, the plating method is electroless and supplying deposition metal ions can be coupled with a method of supplying reducing agent. Supplying reducing agent occurs with simultaneous removal of exchange anion different from the reducing agent.

In one embodiment, according to the method of the present invention, a concentration gradient is established between a plating composition and a deposition metal ion exchange composition. The source of the deposition metal ion is a soluble deposition metal ion salt comprising the deposition metal ion as cation and charge balancing anion. The deposition metal ion exchange composition comprises a relatively higher concentration of the deposition metal ion compared to the plating composition and a relatively lower concentration of exchange cation compared to the plating composition. The two compositions are in chemical contact through a membrane. Because the two compositions are in chemical contact with each other, a chemical potential exists such that the deposition metal ion crosses the membrane from the deposition metal ion exchange composition into the plating composition and the exchange cation crosses the membrane from the plating composition into the deposition metal ion exchange composition. The movement of the relative ions across the membrane may maintain electrical neutrality of the plating composition and the deposition metal ion exchange composition.

In one embodiment, the method of the present invention is accomplished by flowing the plating composition and the deposition metal ion exchange composition through a cation exchange channel fluidically connected to a plating bath and an exchange composition reservoir. The cation exchange channel is compartmentalized into a plating composition flow compartment and a deposition metal ion exchange composition flow compartment by a membrane, which may be a cation exchange membrane or a microporous membrane. The plating composition, which flows into the plating composition flow compartment, comprises deposition metal ion and other cations, which may be present as reaction products or as counter cations to other anionic additives. These additional cations may function as the exchange cations. The deposition metal ion exchange composition, which flows into the deposition metal ion exchange composition flow compartment, comprises a relatively higher concentration of deposition metal ion than the plating composition and a relatively lower concentration of exchange cation than the plating composition. In one embodiment, the concentration of the exchange cation in the deposition metal ion exchange composition is kept as low as possible, such as by complexation with a complexing agent specific for the exchange cation or removal from the deposition metal ion exchange composition.

The flow of both compositions into the cation exchange channel causes the deposition metal ions and the exchange cations to migrate or diffuse according to their respective concentration gradients. That is, since the deposition metal ion exchange composition comprises a relatively higher concentration of deposition metal ions than the plating composition, the deposition metal ions cross the membrane from the deposition metal ion exchange composition to the plating composition, thus supplying the plating composition with deposition metal ions. Exchange cations, which are present in the deposition metal ion exchange composition in a relatively lower concentration than in the plating composition, cross the membrane from the plating composition to the deposition metal ion exchange composition. In this manner, the relative flow of the cations maintains the electrical neutrality of the plating composition and the deposition metal ion exchange composition. Additionally, the plating composition is supplied with and/or replenished with deposition metal ions in a manner which avoids the addition of deposition metal ion salts and thus avoids increasing the concentration of anions in the plating composition. Accordingly, the method can set the ionic concentration of the plating composition, which does not become rapidly over-concentrated with anions.

In one embodiment, flow of the plating composition from a plating composition source and flow of the deposition metal ion exchange composition from a deposition metal ion exchange composition source occurs on opposite ends of the channel, such that the flow directions of the compositions through the channel are opposite relative to each other. By flowing the compositions in opposite directions relative to each other, the concentration gradients of deposition metal ion and exchange cations between the compositions can be maintained relatively constant for the entire length of the cation exchange channel. By maintaining a relatively constant concentration gradient, the efficiency of cation exchange in the cation exchange channel is increased.

In one embodiment, the plating bath can be additionally coupled to an anion exchange channel. The anion exchange channel is compartmentalized into a plating composition flow compartment and a reducing agent exchange composition flow compartment by an anion exchange membrane. In this manner, the plating composition may be supplied and/or replenished with reducing agent, with simultaneous removal of anionic degradation products, which may form, for example, by the oxidation of the reducing agent. The principle of operation of the anion exchange is similar to the principle of the deposition metal ion exchange. That is, the reducing agent exchange composition comprises a relatively lower concentration of anionic degradation products compared to the plating composition and a relatively higher concentration of reducing agent compared to the plating composition. Accordingly, the anionic degradation products migrate according to their concentration gradient across the anion exchange membrane from the plating composition to the anionic exchange composition, and reducing agent migrates according to its concentration gradient across the anion exchange membrane from the reducing agent exchange composition into the plating composition. In this manner, anionic degradation products can be removed from the plating composition while simultaneously replenishing the plating composition with reducing agent in a manner which does not rapidly increase the concentration of cations in the plating composition. In one embodiment, the flow of the plating composition and the flow of the reducing agent exchange composition through the anion exchange channel are opposite relative to each other to increase the efficiency of anion exchange.

In yet another embodiment, the method of the invention is directed to the anionic exchange of deposition metal ions. In this embodiment, the source of deposition metal ions is a negatively-charged complex, for example, tetrachloroplatinate. In this embodiment, the exchange membrane is anionic. The deposition metal ion exchange composition comprises deposition metal ions in negatively charged complexes in a relatively higher concentration compared to the plating composition and exchange anions different from the deposition metal ion complexes in a relatively lower concentration compared to the plating composition. The exchange anions may be, for example, hydroxide, sulfate, chloride, bromide, iodide, carboxylate, sulfamate, and combinations thereof. In one embodiment, the flow of the plating composition and the flow of the deposition metal ion exchange composition through the anion exchange channel are opposite relative to each other to increase the efficiency of deposition metal ion exchange.

A cation exchange channel suitable for carrying out cationic deposition metal ion exchange according to the method of the present invention is depicted in FIG. 1. In FIG. 1, a cation exchange channel 9 is shown which is compartmentalized into a plating composition flow compartment 1 and a deposition metal ion exchange composition flow compartment 2 by a membrane 3, which may be a cation exchange membrane or a microporous membrane. The cation exchange channel 9 is fluidically connected to a plating bath (not shown) by a plating composition source 5 and a plating composition drain 7. The cation exchange channel 9 is further fluidically connected to a deposition metal ion exchange composition reservoir (not shown) by a deposition metal ion exchange composition source 6 and a deposition metal ion exchange composition drain 8.

With further reference to FIG. 1, according to an exemplary method for replenishing deposition metal ions in a plating composition, a portion of plating composition may be diverted from the plating bath and flowed into the cation exchange channel 9 through plating composition source 5 according to direction 10. Deposition metal ion exchange composition may be flowed from the deposition metal ion exchange composition reservoir into the cation exchange channel 9 through the deposition metal ion exchange composition source 6 according to direction 12. Accordingly, the respective compositions flow in opposite directions over the membrane 3, which may be a cation exchange membrane or a microporous membrane. The deposition metal ion exchange composition comprises a relatively higher composition of deposition metal ion, which may be $Ni^{2+}$ ion, for example, as in FIG. 1, than the plating composition, which may be depleted in deposition metal ion due to its use in a plating operation. Moreover, the deposition metal ion exchange composition comprises a relatively lower concentration of exchange cation, which may be $Na^+$ ion or $H^+$ ion (representing hydronium ion), for example, as in FIG. 1. Because of the nickel, sodium, and hydronium concentration gradients which exist between the plating composition and deposition metal ion exchange composition, a chemical potential drives cation exchange through the membrane 3, which thereby replenishes the plating composition with $Ni^{2+}$ ion and, to maintain electrical neutrality, removes $Na^+$ and $H^+$ ions from the plating composition. The opposite flow directions of the respective compositions maintains the concentration gradient relatively constant over the length of the membrane 3. The replenished plating composition then returns to the plating bath through plating composition drain 7 in the direction 11, and the deposition metal ion exchange composition may return to the deposition metal ion exchange reservoir or a waste stream through deposition metal ion exchange composition drain 8 according to the direction 13. In one embodiment, the deposition metal ion exchange composition may be regenerated by removing the exchange cations through chemical or physical means, adding additional deposition metal ion, and reused.

Figure 2:
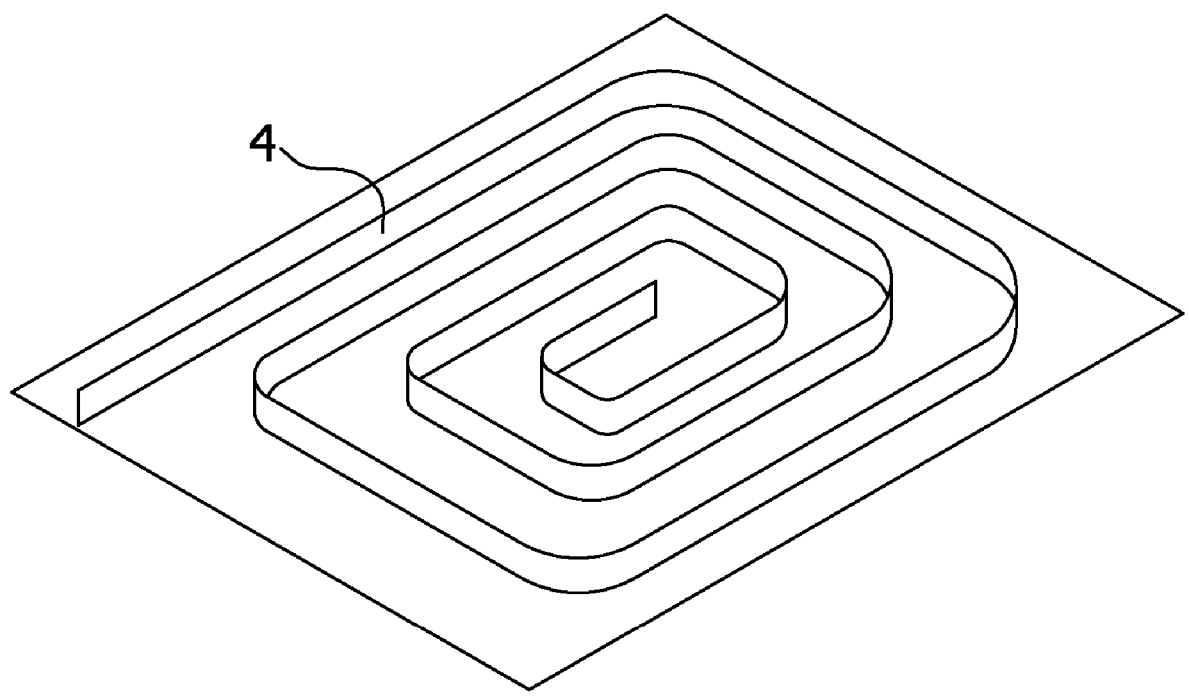
FIG. 2 is a schematic depiction of a cation exchange channel useful for exchanging cations between a plating composition and a deposition metal ion exchange composition in the shape of a meandering flow channel.

FIG. 2 depicts another embodiment of the channel of the present invention in which the plating composition flow compartment and an exchange composition flow compartment are arranged as a meandering flow channel 4. Such a configuration is advantageous because it maximizes chemical contact between the plating composition and deposition metal ion exchange composition which increases the efficiency of cation exchange in a configuration which minimizes space requirements.

The cation exchange channel is compartmentalized into the plating composition flow compartment and the deposition metal ion exchange composition compartment by a membrane 3 (referring to FIG. 1). The membrane may be a cation exchange membrane or a microporous membrane. The membrane may be shaped into a flat membrane or a hollow fiber membrane. The function of the membrane in the cation exchange channel is to provide a means by which the plating composition and deposition metal ion exchange composition can chemically contact each other thus allowing cations to migrate or diffuse from one composition to another. The compositions may be physically separated in that the membrane does not allow free dissolution of the compositions into each other such that the compositions do not become homogenous. This is preferred when the membrane is a cation exchange membrane. In this embodiment, the cation exchange membrane physically inhibits such free dissolution while allowing the compositions to chemically contact each other such that cations may migrate through the membrane from one composition to another. In an embodiment which uses a microporous membrane, some composition intermixing may occur because the pores of a microporous membrane may be large enough to allow through-diffusion of cations and water molecules. In this embodiment, the mechanism of exchange does not depend upon exchange of cations on the functional groups of the cation exchange membrane, but rather on simple diffusion according to each cation's concentration gradient as predicted by Fick's law of diffusion.

In order to maintain a physical barrier between the compositions in the cation exchange channel, the cation exchange membrane may be constructed from highly-dense inter-networks of polymers such that water molecules cannot diffuse through the membrane even under pressure. Moreover, the cation exchange membrane restricts the passage of anions through the membrane from one composition to another. To function as a cation exchange membrane, the polymers comprise weakly acidic and strongly acidic functional groups, such as carboxylates and sulfates. These functional groups may be initially charge balanced with hydrogen or sodium ions. As a deposition metal migrates through the cation exchange membrane, the deposition metal ion displaces the counter-cation and associates with the negatively-charged functional group. The driving force for the migration of the deposition metal ion through the cation exchange membrane is the concentration gradient established between the two compositions. Deposition metal ion migrates from one functional group to another from the deposition metal ion exchange composition to the plating composition, while exchange cations, such as hydrogen and sodium ions, migrate from the plating composition to the deposition metal ion exchange composition to maintain electrical neutrality of the respective compositions.

Exemplary cation exchange membranes include the class of poly perfluorinated sulfonated ionomers sold under the trade name Nafion® (available from E.I. du Pont de Nemours and Company). Nafion® comprises sulfonate as a strongly acidic cation exchange functional group. An exemplary Nafion® polymer for use as a cation exchange membrane in the cation exchange channel is sold under the trade name Nafion® 901.

Another exemplary cation exchange membrane is Flemion® (available from Asahi Glass Co., Ltd.), which is a poly perfluorinated ionomer comprising carboxylate as a weakly acidic cation exchange functional group. Additional exemplary membranes include Neosepta® CMX and CMS from Tokuyama Soda. In one embodiment, the cation exchange membrane is an ion selective membrane.

In another embodiment, the membrane is in the form of a microporous membrane. Microporous membranes lack functional groups. Rather, the microporous membranes comprise pores, which allow cations, anions, and water molecules to diffuse from one composition to another. In this manner, exchange of metal deposition ions and exchange cations is due solely to the respective concentration gradients established between each composition. Microporous membranes may be constructed from materials such as polypropylene, polyvinyl chloride, polytetrafluoroethylene, glasses, and fabrics. Microporous membranes are characterized by pores sized to allow cations, hydrated cations, water, and anions to diffuse through the membrane material.

An exemplary structure of a microporous membrane is a hollow fiber membrane. An exemplary hollow fiber membrane is sold by Membrana as product type S6/2, which is a hollow fiber membrane constructed of polypropylene having a nominal pore size of about 0.2 µm, an inner diameter of 1800 µm, and a wall thickness of 450 µm.

An anion exchange channel has substantially the same structure of the cation exchange channel depicted in FIG. 1, except that an anion exchange membrane compartmentalizes the anion exchange channel into a plating composition flow compartment and an anion exchange composition flow compartment. Moreover, the anion exchange channel is fluidically connected to a plating bath by a plating composition source and a plating composition drain. The anion exchange channel is further fluidically connected to anion exchange composition reservoir by an anion exchange composition source and an anion exchange composition drain. In an exemplary replenishment process, the anion exchange composition may comprise the deposition metal ion present as a negatively-charged complex, such as, for example, tetrachloroplatinate ($[Pt(Cl)_4]^{2-}$) in a relatively higher concentration compared to the plating composition. The anion exchange composition furthers comprises exchange anions different from the deposition metal ion present as a negatively-charged complex in a relatively lower concentration compared to the plating composition. These exchange anions can be, for example, hydroxide ($OH^-$) and chloride ($Cl^-$). Because of the tetrachloroplatinate, hydroxide, and chloride concentration gradients which exist between the plating composition and the anion exchange composition, a chemical potential drives anion exchange across the anion exchange membrane, which thereby supplies the plating composition with $[Pt(Cl)_4]^{2-}$ ion and removes $OH^-$ and $Cl^-$ ions from the plating composition. The exchange of anions can maintain the electrical neutrality of the plating composition and the anion exchange composition.

The anion exchange membrane may be constructed from highly-dense inter-networks of polymers such that water molecules cannot diffuse through the membrane even under pressure. Moreover, the anion exchange membrane restricts the passage of cations through the membrane from one composition to another. To function as an anion exchange membrane, the polymers comprise weakly basic and strongly basic functional groups, most notably amines. Weakly basic functional groups are typically primary, secondary, and tertiary amines. Strongly basic functional groups include quaternary amines. Exemplary anion exchange membranes include DSV from Asahi Glass and Neosepta® AFX, AMX, and ACS from Tokuyama Soda. In one embodiment, the anion exchange membrane is an ion selective membrane.

With regard to deposition chemistry, substrates may be surface coated with a variety of metals in both decorative and functional coating applications. For example, it is known to coat substrates with copper, nickel, cobalt, silver, gold, platinum, and palladium. These metal coatings may be plated pure or as alloys with two or more metals. In some applications, such as in plating metal-based caps over interconnect features in semiconductor integrated circuit device manufacture, it is known to plate cobalt and nickel as composites with non-metals such, for example, phosphorus and boron.

The plating composition and deposition metal are chosen based on the desired coating. Many of the metals useful for coating substrates may be plated by electrolytic or electroless plating processes. Some may be plated by either type of process. In a preferred embodiment, the plating method is electroless.

In general, the deposition metal ions, which may be selected from among copper ions, nickel ions, cobalt ions, silver ions, gold ions, platinum ions, palladium ions, and combinations thereof are added to the plating composition as soluble deposition metal ion salts. Accordingly, the plating composition additionally comprises the deposition metal ion's counter anion, which may be selected from among sulfate, nitrate, phosphate, halide, carbonate, hydrocarbonate, citrate, tartrate, maleate, acetate, oxalate, carbyoxlate, hydroxycarboxylate, and combinations thereof. The plating composition also typically comprises additives which are added to enhance plating rate, bath stability, and plating quality. The plating composition also comprises cations other than the deposition metal ion. These cations are present due to the addition of certain bath additive salts. The cations may be, for example, hydronium ions, sodium ions, lithium ions, potassium ions, magnesium ions, strontium ions, barium ions, ammonium ions, and combinations thereof. These cations advantageously act as exchange cations during the deposition metal ion exchange method of the present invention. In embodiments in which the deposition metal ion is added to the plating composition as a soluble salt of a deposition metal cation, replenishment of the plating composition with deposition metal ion occurs by cation exchange.

In certain deposition chemistries, the deposition metal ion is added as a soluble negatively-charged complex. Typically, the negatively-charged complex can comprise halide ions, most typically chloride ions. Alternatively, the negative-charged complex can comprise cyanide ions. Accordingly, the deposition metal ions present as negatively-charged complexes are counter-balanced with cations. When employing deposition chemistry whereby the deposition metal ion is present as a negatively-charged complex, replenishment of the plating composition with the deposition metal ion occurs by anion exchange.

Where a copper deposit is desired, any conventional copper plating chemistry may be chosen. Typically, copper ions may be introduced into an acidic plating composition as a salt of sulfate, fluoroborate, pyrophosphate, cyanide, phosphonate, tartrate and other complexes including sulfonate complexes such as methanesulfonate. The initial copper concentration in a copper plating composition may be from about 4 to about 70 g/L of $Cu^{2+}$. Additionally, the copper plating composition may comprise additives as known in the art, such as brighteners, levelers, suppressors, surfactants, halides and other known additives. The acid concentration may be between about 2 g/L and about 225 g/L acid.

Where a nickel deposit is desired, any conventional nickel plating chemistry may be chosen. Nickel ions may be introduced into a plating composition as an inorganic Ni salt such as chloride, sulfate, sulfamate, sulfonate, hydroxide, or other suitable inorganic salt, or a Ni complex with an organic carboxylic acid such as Ni acetate, citrate, lactate, succinate, propionate, hydroxyacetate, or others. The Ni salt or complex may be added to provide about 1 g/L to about 20 g/L of $Ni^{2+}$.

Where a cobalt deposit is desired, any conventional cobalt plating chemistry may be chosen. Cobalt ions may be introduced into a plating composition as an inorganic Co salt such as chloride, sulfate, sulfamate, sulfonate, hydroxide, or other suitable inorganic salt, or a Ni complex with an organic carboxylic acid such as Ni acetate, citrate, lactate, succinate, propionate, hydroxyacetate, or others. The Co salt or complex may be added to provide about 0.5 g/L to about 20 g/L of $Co^{2+}$.

In a preferred embodiment, the cobalt or nickel deposits are plated from alkaline electroless plating compositions. Accordingly, the plating composition may additionally comprise a reducing agent, which may be a source of hypophosphite or a source of a borane-based reducing agent. Exemplary hypophosphite salts include ammonium hypophosphite, sodium hypophosphite, and potassium hypophosphite. Exemplary sources of borane-based reducing agents include borohydrides (sodium, potassium, cyano, trimethoxy, and tetramethylammonium, among others), monomethyl amine borane, isopropyl amine borane, dimethyl amine borane (DMAB), diethyl amine borane (DEAB), trimethyl amine borane, triethyl amine borane, triisopropyl amine borane, pyridine borane, and morpholine borane. The reducing agent may be added in a concentration ranging from about 0.5 g/L to about 30 g/L. The plating composition may additionally comprise an alkaline buffering agent, surfactants, complexing agents, and other additives as are known in the art.

Where a silver deposit is desired, any conventional silver plating chemistry may be chosen. Silver ions may be introduced into a plating composition as soluble silver inorganic salts, such as nitrate and sulfonate. Insoluble and sparingly soluble silver salts such as salts of halides are preferably avoided. Moreover, the plating composition is preferably free of anions which form insoluble and sparingly soluble salts.

Where a gold, platinum, or palladium deposit is desired, any another conventional gold, platinum, or palladium plating chemistry may be chosen. Gold ions may be introduced into a plating composition as soluble gold salts, such as chloride, bromide, and cyanide. Platinum ions may be introduced into a plating composition as soluble platinum salts, such as chloride, iodide, and cyanide. Palladium ions may be introduced into a plating composition as soluble palladium salts, such as sulfate and chloride.

In some embodiments, the deposition metal ions may be added to the plating composition as negatively-charged complexes. For example, platinum may be added as tetrachloroplatinate(II) counter-balanced with ammonium, sodium, or potassium. Other sources of platinum in a negatively-charged complex include hexachloroplatinate(IV) and hexachloroplatinic acid. Gold may also be added as a negatively-charged complex. Exemplary gold complexes include gold chloride ($HAuCl_4$), potassium gold chloride ($KAuCl_4$), and sodium tetrachloroaurate(III) dihydrate ($NaAuCl_4.2H_2O$). Where the source of deposition metal ion is a negatively-charged complex, replenishment of the bath occurs by anion exchange.

The plating chemistry, which includes the deposition metal ions, pH buffering agents, and other additives, such as reducing agents, particular to the deposition metal and plating method, yields a plating composition having an initial ionic strength, i.e., total concentration of all cations and anions. The identity and concentration of the cations and anions may vary during the course of the plating process, which may additionally affect the ionic strength. For example, as plating progresses, the concentration of the deposition metal ion decreases as the deposition metal deposits onto the surface of the substrate. Moreover, the concentration of the reducing agent, in an electroless process, also decreases as it becomes oxidized. Finally, the concentration of oxidation by-products may increase. These oxidation by-products may result from the oxidation of the reducing agent in an electroless process or the oxidation of other additives in an electrolytic process. Conventional methods of replenishment of deposition metal ions and reducing agents are known to rapidly increase the ionic strength of the composition through the addition of counter cations to the reducing agent and counter anions to the deposition metal ion. The rate of increase of ionic strength may be inhibited or even prevented through the replenishment method of the present invention which chemically couples the plating composition with a deposition metal ion exchange composition through the membrane in a cation exchange channel or an anion exchange channel.

The deposition metal ion exchange composition comprises deposition metal ion in a relatively higher concentration than the concentration of the deposition metal ion in the plating composition. Additionally, the deposition metal ion exchange composition may comprise a complexing agent, which complexes exchange cation, lowering the exchange cation's effective concentration in the deposition metal ion exchange composition.

Sources of deposition metal ions in the deposition metal ion exchange composition include all of the sources listed above in connection with the plating composition chemistry. For example, the sources of nickel applicable to the nickel plating composition are just as applicable to the deposition metal ion exchange composition.

To achieve a concentration gradient between the plating composition and the deposition metal exchange composition with regard to the deposition metal ion, the concentration of the deposition metal ion in the exchange composition is relatively higher than the concentration in the plating composition. Preferably, the concentration of deposition metal ion in the deposition metal ion exchange composition is added near the solubility limit of the particular deposition metal ion salt. This is preferred to achieve the highest possible concentration gradient between the deposition metal ion exchange composition and the plating composition. For example, the solubility of anhydrous nickel chloride is about 19.6 M. A nickel plating composition typically contains an initial nickel concentration between about 0.015 M and about 0.34 M. The nickel concentration may be as low as 0 M, and the method of the present invention may be used to supply nickel ion to the plating composition. Additionally, the nickel ion concentration may be lower than the initial nickel concentration due to depletion during a plating operation, and the method of the present invention may be used to replenish nickel ion to a depleted plating composition. Accordingly, the concentration of nickel chloride in an exemplary nickel ion exchange composition is preferably at least about 0.34 M, such as between about 0.5 M and about 19.6 M. Any concentration within this range ensures that a concentration gradient is achieved in the nickel ion exchange composition relative to the nickel plating composition. The nickel concentration in the nickel ion exchange composition may be chosen to a set the deposition metal ion concentration in the plating composition within a desired range. This is advantageous where control of the nickel concentration in the plating composition is desired to ensure a high quality deposit, to ensure a matte or a bright deposit, or for plating compositions useful for plating alloys containing nickel in a desired weight percent.

To achieve a concentration gradient between the plating composition and the deposition metal ion exchange composition with regard to the exchange cation, the concentration of the exchange cation in the deposition metal ion exchange composition is relatively lower than the concentration in the plating composition. Preferably, the concentration of cations other than the deposition metal ion in the deposition metal ion exchange composition is as low as possible. Because a plating composition typically comprises a variety of cations, which are present because additives may be added as soluble salts, a concentration gradient can be easily achieved with respect to the deposition metal ion exchange composition by not adding any cations to the composition other than the deposition metal ion. Some exchange cation, especially hydronium, calcium, sodium, magnesium and the like, is typically present in the deposition metal ion exchange due to impurities present in the deposition metal ion source or as counter-cations to complexing agents. However, the concentration of cations due to impurities is typically lower than the cation concentration in the plating composition.

Because the deposition metal ion exchange composition becomes enriched in the exchange cations during the cation exchange process, the deposition metal ion exchange composition may comprise complexing agents specific to the exchange cations. By including complexing agents, the effective concentration of the exchange cations in the exchange composition is decreased, as shown by the following equation:

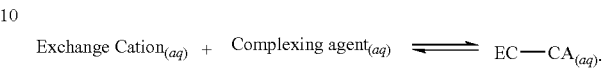

According to the equation, as the exchange cation and complexing agent complex to form the EC-CA complex, the concentration of the exchange cation in the deposition metal ion exchange composition decreases. Therefore, the relatively lower concentration of the exchange cation in the exchange composition compared to the plating composition can be maintained by including a complexing agent. Exemplary complexing agents effective for forming complexes with the exchange cations include tributylphosphate and the crown ethers. The crown ethers include 12-crown-4, 15-crown-5, 18-crown-6, among others.

During a plating operation, the concentration of the deposition metal ion decreases in the plating composition due to the reduction of the deposition metal ion to deposited metal on the surface of the substrate. The plating composition provides the source of electrons necessary to reduce the deposition metal ions. This source of electrons may be a reducing agent (which is typically anionic), as in electroless plating processes, or an additive which is oxidized at the anode, as in electrolytic plating processes. In this manner, the electrical neutrality of the plating composition is maintained as plating progresses. In other words, as the deposition metal ion concentration (a cation) decreases, either more cations are formed, such as hydronium ions, or the anion concentration decreases.

Additionally, the plating composition maintains a relatively constant total ionic strength, such that during the course of the plating operation, the ionic strength may decrease only slightly, remain relatively unchanged, or may increase only slightly.

In a conventional plating operation, as plating continues, replenishment of the deposition metal ion may be needed to maintain an adequate plating rate, quality of the plated deposit, or a plated alloy comprising the deposition metal within a desired weight percentage. Accordingly, a salt of the deposition metal ion may be added to the solution, thus increasing the concentration of counter anions in the plating composition. Moreover, in electroless plating, as the reducing agent is degraded, the reducing agent may be replenished. Accordingly, addition of the reducing agent increases the concentration of counter cations. The net result in a conventional plating operation where deposition metal ions and reducing agents are intermittently or continuously replenished by simply adding them to the plating composition is a relatively large increase in ionic strength as the deposition metal and reducing agent turn over. Clearly, as the deposition metal continues to turnover during the course of a plating operation, the ionic strength increases rapidly. At some point, which may be between two and five metal turnovers, the ionic strength of the plating composition is so high as to adversely affect the plating composition and deposit quality. Thereafter, it may be necessary to replace the entire plating composition with a fresh composition.

The method of the present invention reduces the rate of, or may even prevent an, increase in ionic strength of the plating composition during deposition metal ion and reducing agent replenishment, thus increasing the number of metal turnovers before the composition in its entirety needs to be replaced. This goal is accomplished by flowing the plating composition and a deposition metal ion exchange composition through the above-described cation exchange channel. By flowing the plating composition and the deposition metal ion exchange composition through the cation exchange channel, the deposition metal ion exchange composition replenishes the plating composition with deposition metal ion. To maintain electrical neutrality, the deposition metal ion exchange composition additionally removes exchange cations from the plating composition. In this method, replenishing the plating composition with a deposition metal ion simultaneously removes an exchange cation different from the deposition metal ion such that there is no overall increase in the ionic strength of the plating composition.

The deposition metal ion exchange composition becomes enriched in exchange cations. After recovery of the deposition metal ion exchange composition which is enriched in exchange cations, the composition may be regenerated by removing the exchange cations.

As plating continues, it may be necessary to add reducing agent. Although addition of the reducing agent increases the ionic strength of the composition, the cationic exchange reaction does not. Accordingly, as the deposition metal turns over, the ionic strength increases more slowly compared to the conventional replenishment process.

Optionally, the rate of increase in ionic strength due to reducing agent replenishment may be decreased or even prevented by further coupling the plating bath with an anion exchange channel, which is compartmentalized into a plating composition flow compartment and a reducing agent exchange composition flow compartment by a membrane, which may be an anion exchange membrane. When an anion exchange channel is used, plating composition flows through the plating composition flow compartment and reducing agent exchange composition flows through reducing agent exchange composition flow compartment. The reducing agent exchange composition may comprise a relatively higher concentration of reducing agent compared to the plating composition and a relatively lower concentration of anions, which may be exchange anions, compared to the plating composition. As the composition flows through the anion exchange membrane, reducing agent migrates according to its concentration gradient from the reducing agent exchange composition flow compartment to the plating composition flow compartment. To maintain electrical neutrality, exchange anions from the plating composition migrate from the plating composition to the reducing agent exchange composition. In this manner, the plating composition can be replenished with reducing agent with no increase in ionic strength.

By using both a cation exchange channel and an anion exchange channel, advantageously, a plating composition can be replenished with both deposition metal ion and reducing agent with little or no variance in the total ionic strength of the plating composition.

In view of the above, it may be seen that the several objects of the invention are achieved and other advantageous results attained.

When introducing elements of the present invention or the preferred embodiment(s) thereof, the articles "a", "an", "the" and "said" are intended to mean that there are one or more of the elements. For example, that the foregoing description and following claims refer to "a" cation means that there are one or more such cations. The terms "comprising", "including" and "having" are intended to be inclusive and mean that there may be additional elements other than the listed elements.

As various changes could be made in the above without departing from the scope of the invention, it is intended that all matter contained in the above description and shown in the accompanying drawings shall be interpreted as illustrative and not in a limiting sense. The scope of invention is defined by the appended claims and modifications to the embodiments above may be made that do not depart from the scope of the invention.

What is claimed is:

1. A method for setting the ionic concentration of a plating composition comprising a deposition metal ion, the plating composition useful for depositing metal on the surface of a substrate, the method comprising:

dialyzing the plating composition by Donnan dialysis by flowing the plating composition along a first surface of a membrane while simultaneously flowing a deposition metal ion exchange composition as an ion exchange composition along a second surface of the membrane such that the deposition metal ion crosses the membrane from the deposition metal ion exchange composition to the plating composition while an exchange cation different from the deposition metal ion crosses the membrane from the plating composition to the deposition metal ion exchange composition.

2. The method of claim 1 wherein the ionic concentration of the plating composition is set by flowing a portion of the plating composition and flowing a portion of the deposition metal ion exchange composition through a compartmentalized cation exchange channel, the cation exchange channel comprising a plating composition flow compartment, a deposition metal ion exchange composition flow compartment, and the membrane, wherein:

the membrane separates the plating composition flow compartment and the deposition metal ion exchange composition flow compartment; and the deposition metal ion exchange composition comprises a relatively higher concentration of the deposition metal ion compared to the plating composition and a relatively lower concentration of the exchange cation compared to the plating composition.

3. The method of claim 1 wherein said setting the ionic concentration comprises supplying the plating composition with deposition metal ions.

4. The method of claim 1 wherein said setting the ionic concentration comprises replenishing the plating composition with deposition metal ions during a plating operation.

5. The method of claim 2 wherein the membrane is a cation exchange membrane or a microporous membrane.

6. The method of claim 2 wherein the deposition metal ion exchange composition further comprises a complexing agent.

7. The method of claim 6 wherein the complexing agent is selected from the group consisting of tributylphosphate, crown ether, and a combination thereof.

8. The method of claim 1 wherein the deposition metal ion is selected from the group consisting of copper ion, nickel ion, cobalt ion, silver ion, gold ion, platinum ion, palladium ion, and combinations thereof.

9. The method of claim 2 wherein the deposition metal ion is present in the deposition metal ion exchange composition as a deposition metal ion salt, wherein the deposition metal ion salt comprises the deposition metal ion and an anion, wherein:

the deposition metal ion is selected from the group consisting of copper ion, nickel ion, cobalt ion, silver ion, gold ion, platinum ion, palladium ion, and combinations thereof; and the anion is selected from the group consisting of sulfate, nitrate, phosphate, halide, carbonate, hydrocarbonate, citrate, tartrate, maleate, acetate, oxalate, carboxylate, and hydroxycarboxylate.

10. The method of claim 1 wherein the exchange cation different from the deposition metal ion is selected from the group consisting of hydrogen, lithium, sodium, potassium, magnesium, strontium, barium, ammonium, and combinations thereof.

11. The method of claim 2 wherein the exchange cation different from the deposition metal ion is selected from the group consisting of hydrogen, lithium, sodium, potassium, magnesium, strontium, barium, ammonium, and combinations thereof.

12. The method of claim 2 wherein flow of the plating composition through the plating composition flow compartment and flow of the deposition metal ion exchange composition through the deposition metal ion exchange composition flow compartment are such that a flow direction of the plating composition through the plating composition flow compartment along the first surface of the membrane and a flow direction of the deposition metal ion exchange composition through the deposition metal ion exchange composition flow compartment along the second surface of the membrane are opposite relative to each other.

13. The method of claim 2 wherein the membrane is an ion selective membrane.

14. The method of claim 2 wherein the membrane is a flat membrane or a hollow fiber membrane.

15. The method of claim 2 wherein after flow of the deposition metal ion exchange composition through the cation exchange channel, the deposition metal ion exchange composition is regenerated by removing the exchange cation from the deposition metal ion exchange composition.

16. The method of claim 4 wherein replenishing the plating composition with deposition metal ions occurs simultaneously with metal deposition on the surface of the substrate.

17. The method of claim 2 further comprising the step of supplying the plating composition with a reducing agent by flowing the plating composition along a first surface of an anion exchange membrane while simultaneously flowing a reducing agent exchange composition along a second surface of the anion exchange membrane such that the reducing agent crosses the anion exchange membrane from the reducing agent exchange composition to the plating composition while an exchange anion different from the reducing agent crosses the anion exchange membrane from the plating composition to the reducing agent exchange composition.

18. The method of claim 17 wherein the plating composition is supplied with the reducing agent by flowing a portion of the plating composition through a compartmentalized anion exchange channel, the anion exchange channel comprising a second plating composition flow compartment, a reducing agent exchange composition flow compartment, and anion exchange membrane, wherein:

the anion exchange membrane separates the second plating composition flow compartment and the reducing agent exchange composition flow compartment; and the reducing agent exchange composition comprises a relatively higher concentration of the reducing agent compared to the plating composition and a relatively lower concentration of the exchange anion compared to the plating composition.

19. The method of claim 1 wherein said method maintains electroneutrality in the plating composition.

* * * * *